US012650531B2

(12) United States Patent (10) Patent No.: US 12,650,531 B2
Shan (45) Date of Patent: Jun. 9, 2026

(54) SYSTEM AND METHOD FOR SEISMIC IMAGING

(71) Applicant: Chevron U.S.A. Inc., San Ramon, CA (US)

(72) Inventor: Guojian Shan, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 469 days.

(21) Appl. No.: 17/938,657

(22) Filed: Oct. 6, 2022

(65) Prior Publication Data

US 2024/0118441 A1 Apr. 11, 2024

(51) Int. Cl.
*G01V 1/34* (2006.01)

(52) U.S. Cl.
CPC .......... *G01V 1/345* (2013.01); *G01V 2210/74* (2013.01)

(58) Field of Classification Search
CPC ........................... G01V 1/345; G01V 2210/74
See application file for complete search history.

(56) References Cited

U.S. PATENT DOCUMENTS

| | | | | |
|---|---|---|---|---|
| 7,725,266 B2 * | 5/2010 | Sirgue | | G01V 1/28 702/6 |
| 8,773,951 B2 | 7/2014 | Shan | | |
| 9,817,143 B2 * | 11/2017 | van Groenestijn | .... | G01V 1/364 |
| 10,317,552 B2 * | 6/2019 | Dellinger | ............... | G01V 1/345 |
| 2012/0014214 A1 * | 1/2012 | Artman | ................. | G01V 1/282 367/25 |
| 2019/0086564 A1 * | 3/2019 | Shen | ...................... | G01V 1/282 |
| 2021/0223424 A1 * | 7/2021 | Valensi | ................. | G01V 1/303 |

FOREIGN PATENT DOCUMENTS

CN 104570090 B * 7/2017

OTHER PUBLICATIONS

Zhigang Zhang et al., "FWI Imaging: Full-Wavefield Imaging Through Full-Waveform Inversion," SEG International Exposition and 90th Annual Meeting, 2020 Society of Exploration Geophysicists, pp. 656-662.

* cited by examiner

*Primary Examiner* — Lina Cordero
*Assistant Examiner* — Lynda Dinh
(74) *Attorney, Agent, or Firm* — Marie L. Clapp

(57) ABSTRACT

A method is described for seismic imaging including receiving a full waveform inversion (FWI) image of a subsurface volume of interest including complex geology; transforming the FWI image to the Fourier domain to generate a Fourier domain image; performing a multi-dimensional low-cut filter of the Fourier domain image to generate a low-cut filter image; phase rotating by 90 degrees the low-cut filter image to generate a phase-rotated image; performing an inverse Fourier transform on the phase-rotated image to generate a transformed image; and displaying the transformed image on a graphical display. The method is executed by a computer system.

6 Claims, 4 Drawing Sheets

200

20 — Receive FWI image

22 — Transform FWI image

24 — Low cut filter

26 — Phase rotate

28 — Inverse transform

White boxes denote areas of interest

White boxes denote areas of interest

SYSTEM AND METHOD FOR SEISMIC IMAGING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to non-invasive techniques for imaging the Earth's subsurface using seismic energy. In particular, the disclosed embodiments improve imaging at geologically complex areas such as around faults and near salt flanks.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This may involve full waveform inversion (FWI). Conventional FWI images are processed by applying a directional derivative along the normal direction of the reflectors. Usually, the normal directions are estimated from the existing images or interpretation. This method will favor the reflectors that have the same direction as the given dips. The reflectors with different dips are attenuated. One issue in this conventional algorithm is that only one dip is allowed for each location, since given dip field is single value at each point. As result, if there are two dips at a given subsurface point, which is usually seen, for example, at faults and salt flanks, reflectors that have different dips from the given field will be attenuated.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic imaging that will allow better imaging in areas with conflicting dips.

SUMMARY

In accordance with some embodiments, a method of seismic imaging including receiving a full waveform inversion (FWI) image of a subsurface volume of interest including complex geology; transforming the FWI image to the Fourier domain to generate a Fourier domain image; performing a multi-dimensional low-cut filter of the Fourier domain image to generate a low-cut filter image; phase rotating by 90 degrees the low-cut filter image to generate a phase-rotated image; and performing an inverse Fourier transform on the phase-rotated image to generate a transformed image is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
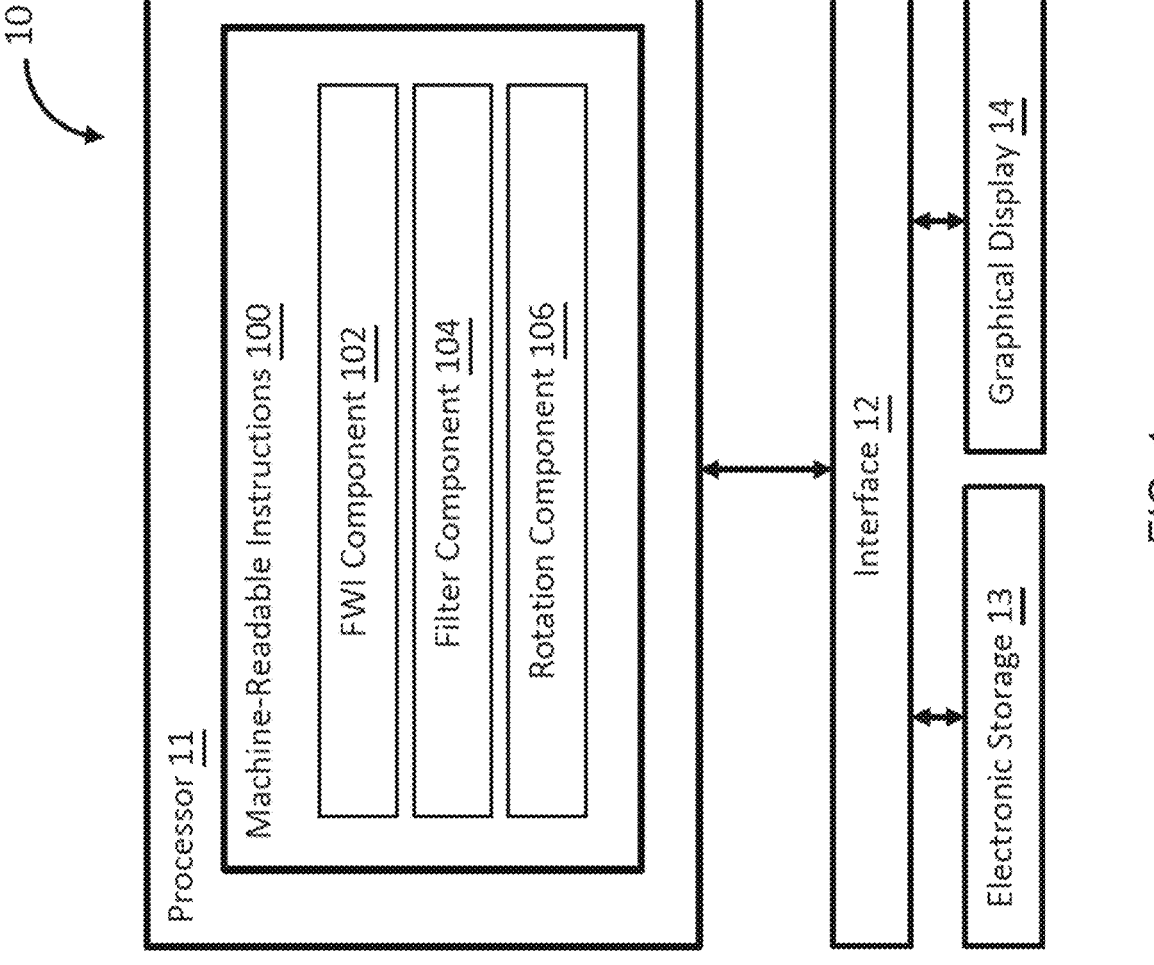
FIG. 1 illustrates an example system for seismic imaging.

Described below are methods, systems, and computer readable storage media that provide a manner of seismic imaging. These embodiments are designed to be of particular use for seismic imaging in areas of complex geology, such as at faults and salt flanks.

Advantageously, those of ordinary skill in the art will appreciate, for example, that the embodiments provided herein may be utilized to generate a more accurate digital seismic image (i.e., the corrected digital seismic image) based on the more accurate earth model generated by the seismic inversion. The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a)

steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 12, and/or other components. Processor 11 is configured to execute instructions that will transform a full waveform inversion (FWI) image into a new FWI image that does not damage the conflicting dips in areas of complex geology.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to seismic data, seismic images, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to seismic images, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate seismic imaging. The machine-readable instructions 100 may include one or more computer program components. The machine-readable instructions 100 may include a FWI component 102, a filter component 104, a rotation component 106, and/or other computer program components.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the FWI component 102 may be configured to receive a FWI image, a FWI velocity model, or a seismic dataset. If a seismic dataset is received, FWI component 102 will perform a full waveform inversion (FWI) using the seismic dataset as input and will generate a FWI velocity model and a FWI image. The FWI may be performed, by way of example and not limitation, using the method disclosed in U.S. Pat. No. 8,773,951. If a FWI velocity model is received, FWI component 102 will generate a FWI image. If a FWI image is received, the FWI component will provide the FWI image to filter component 104. The FWI image will be a 3-D image with dimensions in depth and x and y geographical space, so may be expressed as Image$_{FWI}$(x,y,z).

The filter component 104 may be configured to transform the FWI image into the Fourier domain. This may be done using any Fourier transform, such as the fast Fourier transform (FFT). The transformed FWI image will have dimensions in wavenumber (k) space and can be expressed as Image$_{FWI}$(k$_x$,k$_y$,k$_z$). The transformed FWI image is then low-cut filtered such that the low-cut filter is applied to all dimensions. This is performed by applying the low-cut filter to k$_r$, where k$_r$ is $$k_r = \sqrt{k_x^2 + k_y^2 + k_z^2}$$

and the result may be expressed as Low_cut$_{FWI}$(k$_x$,k$_y$,k$_z$).

The rotation component 106 may be configured to receive the low-cut filtered transformed FWI image Low_cut$_{FWI}$(k$_x$, k$_y$,k$_z$) and apply a 90 degree phase rotation. This is performed by $$\text{Rotated}_{FWI}(k_x, k_y, k_z) = i * \text{Low\_cut}_{FWI}(k_x, k_y, k_z).$$

The rotation component 106 then inverse Fourier transforms the phase rotated image Rotated$_{FWI}$(k$_x$,k$_y$,k$_z$) back into x-y-z space to generate the new image TransformImage(x,y,z).

The output of each of the components may be stored to electronic storage 13 or displayed on graphical display 14.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

Figure 2:
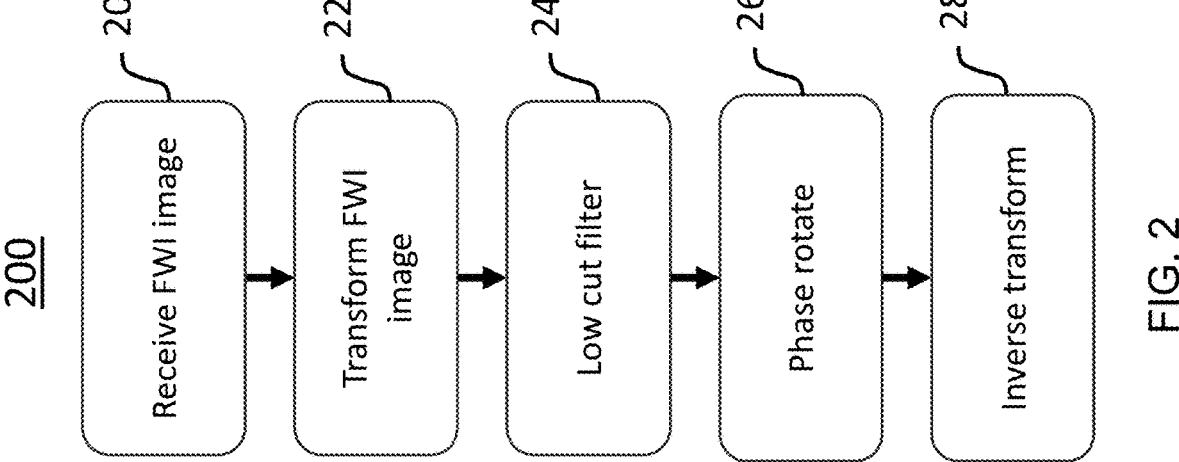
FIG. 2 illustrates an example method for seismic imaging.

FIG. 2 illustrates an example process 200 for seismic imaging. At step 20, the process receives the FWI image. As previously explained, this is a 3-D image Image$_{FWI}$(x,y,z). The 3-D image will contain seismic amplitude information representative of the subsurface, including seismic reflectors representative of geologic features in the subsurface. In some subsurface locations, the seismic reflectors may include or be located near complex geology such as faults and salt flanks. Geologic features such as faults and salt flanks are of particular interest because they may provide traps for subsurface hydrocarbon deposits and/or may cause hazards for drilling. Accurately imaging the reflectors in these locations is important but is difficult due to the conflicting dips of the reflectors.

At step 22, the FWI image is transformed into the Fourier domain. This may be done using any Fourier transform, such as the fast Fourier transform (FFT). The transformed FWI image will have dimensions in wavenumber space and can be expressed as Image$_{FWI}$(k$_x$,k$_y$,k$_z$).

At step 24, a low-cut filter is applied to Image$_{FWI}$(k$_x$,k$_y$, k$_z$). This is a multi-dimensional filter that applies the low-cut filter to k$_r$, where k$_r$ is $$k_r = \sqrt{k_x^2 + k_y^2 + k_z^2}$$

and the result may be expressed as Low-cut$_{FWI}$(k$_x$,k$_y$,k$_z$). Since the low-cut filter is performed in the Fourier domain, there is no direction discrimination and all dips that are located in the same locations are preserved in the image.

At step 26, Low_cut$_{FWI}$(k$_x$,k$_y$,k$_z$) is phase rotated 90 degrees. This is performed by $$\text{Rotated}_{FWI}(k_x, k_y, k_z) = i * \text{Low\_cut}_{FWI}(k_x, k_y, k_z).$$

This phase rotation is performed so that the image will have the same phase as a seismic image obtained by a method like reverse time migration (RTM). Having the same phase makes it easier to compare images generated by different methods which improves the interpretation of the geologic structures.

Step 28 performs an inverse Fourier transform to transform the phase rotated image Rotated$_{FWI}$(k$_x$,k$_y$,k$_z$) back into x-y-z space to generate the new image TransformImage(x, y,z).

Figure 3:
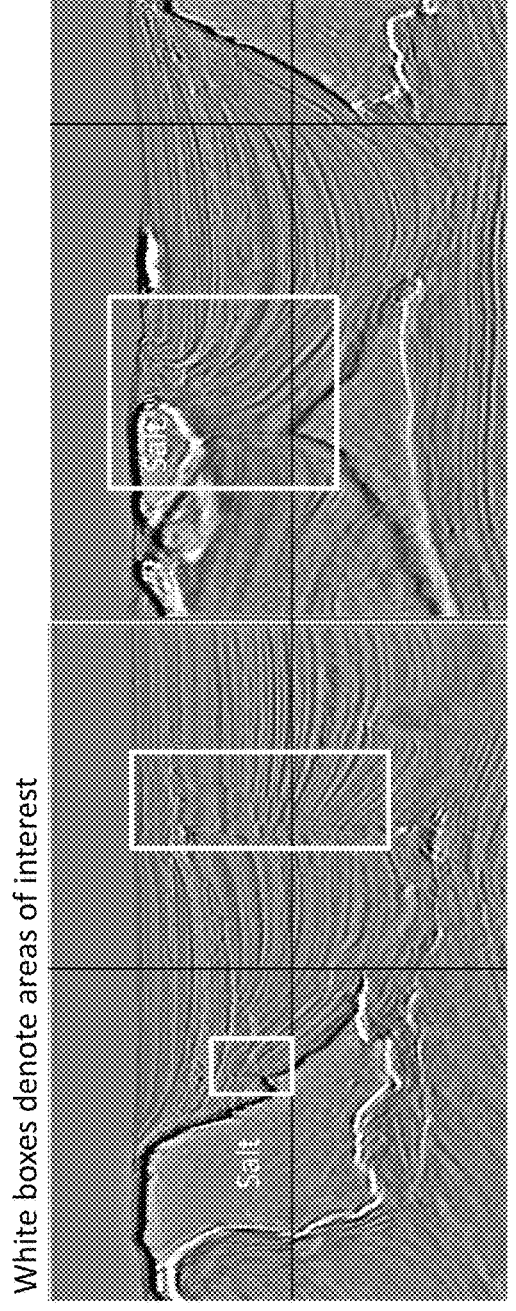
FIG. 3 is an example of a result of an embodiment.
Figure 4:
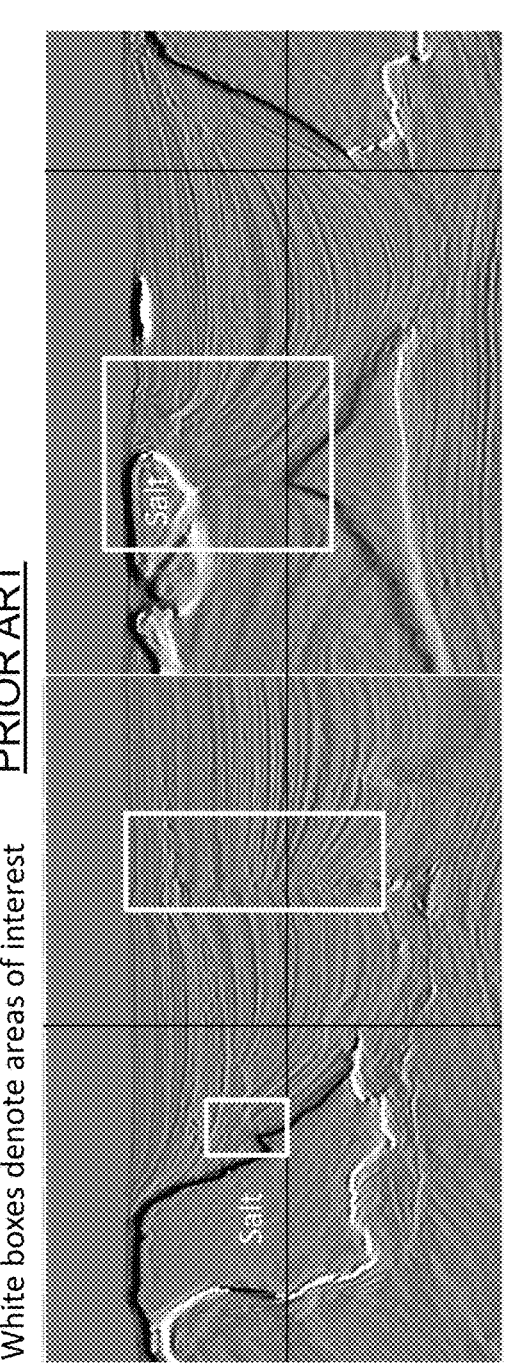
FIG. 4 is an example of a result from a prior art method to compare against FIG. 3.
Figure 5:
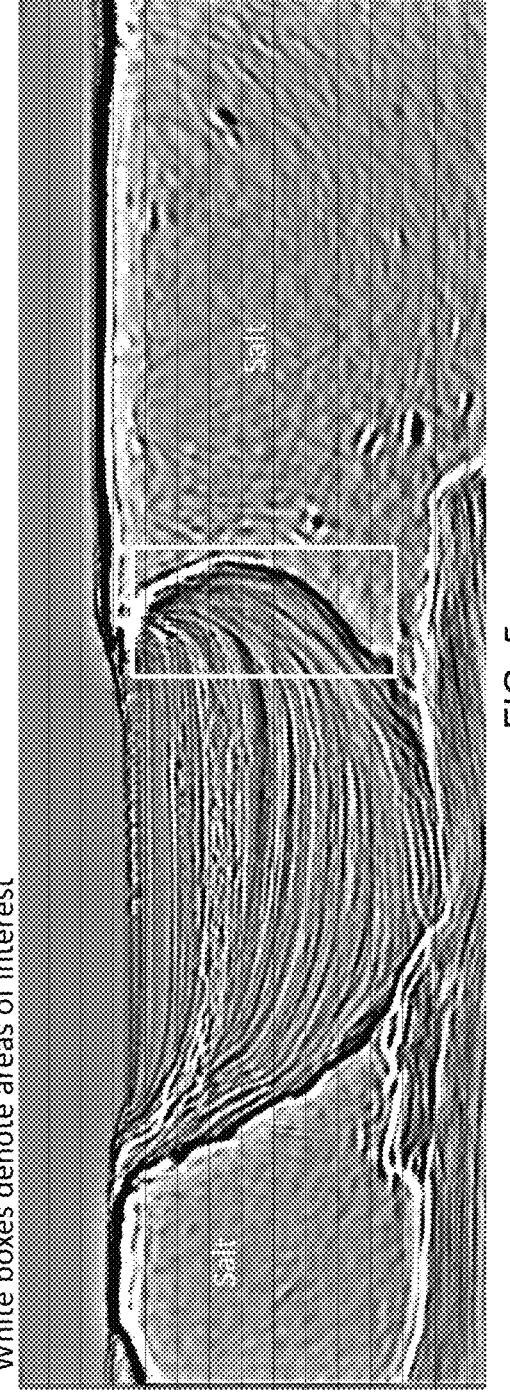
FIG. 5 is an example of a result of an embodiment.
Figure 6:
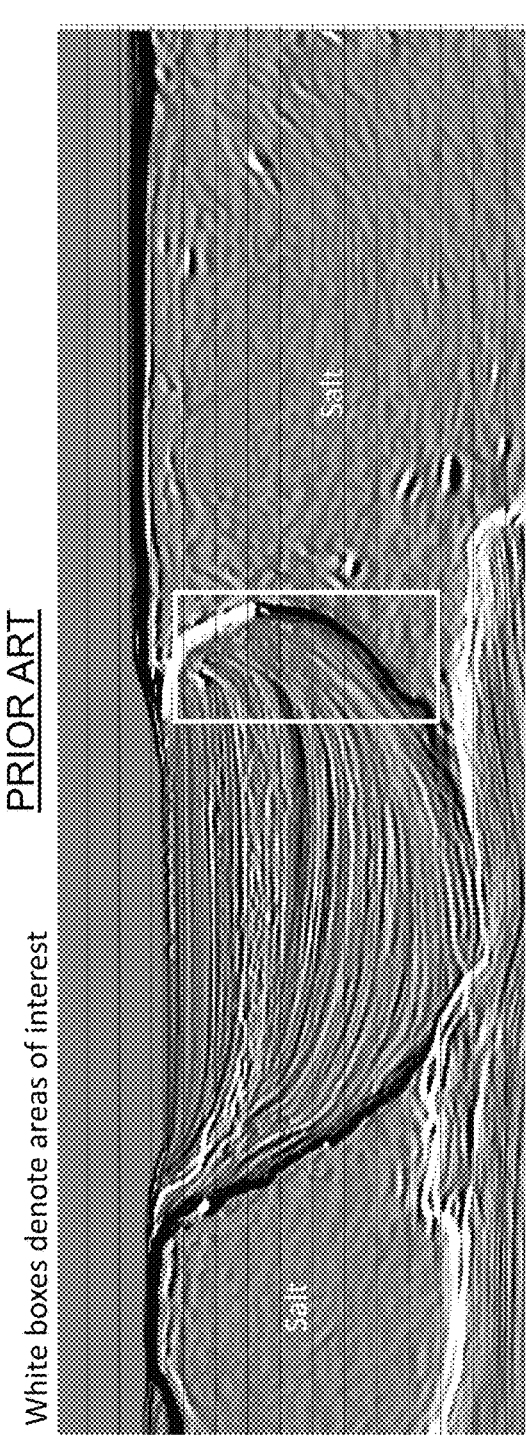
FIG. 6 is an example of a result from a prior art method to compare against FIG. 5.

FIG. 3 shows a result of method 200. In particular, note the seismic reflectors that appear in the white boxes. These complex areas are near salt flanks or a fault. Comparing these to the result of a prior art method shown in FIG. 4, it is clear that the present invention generates much clearer reflectors in the complex areas. Likewise, the result of method 200 shown in FIG. 5 has much clearer reflectors in the white box than those seen in the prior art result shown in FIG. 6.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging, comprising:

a. receiving, at a computer processor, a full waveform inversion (FWI) image of a subsurface volume of interest including complex geology with two dips at subsurface points;

b. transforming, via the computer processor, the FWI image to the Fourier domain to generate a Fourier domain image, wherein the Fourier domain image is expressed in wavenumber space as Image$_{FWI}$ (k$_x$, k$_y$, k$_z$);

c. performing, via the computer processor, a multi-dimensional low-cut filter of the Fourier domain image to generate a low-cut filter image, wherein the multi-dimensional low-cut filter is applied to k$_r$, where $$k_r = \sqrt{k_x^2 + k_y^2 + k_z^2} \text{ to}$$

generate the low-cut filter image Low_cut$_{FWI}$ (k$_x$, k$_y$, k$_z$) and wherein there is no direction discrimination so all dips in the low-cut filter image are preserved;

d. phase rotating by 90 degrees the low-cut filter image, via the computer processor, to generate a phase-rotated image in order to match a phase of a seismic migration image;

e. performing an inverse Fourier transform on the phase-rotated image, via the computer processor, to generate a transformed image, wherein the transformed image includes conflicting dips of reflectors representative of the complex geology; and f. using the transformed image for improved hydrocarbon exploration and hydrocarbon production by identifying traps for subsurface hydrocarbon deposits or hazards for drilling.

2. The method of claim 1 wherein the phase rotating is performed as Rotated$_{FWI}$ (k$_x$, k$_y$, k$_z$)=i*Low_cut$_{FWI}$(k$_x$, k$_y$, k$_z$).

3. A computer system, comprising:

one or more processors;

memory; and one or more programs, wherein the one or more programs are stored in the memory and configured to be executed by the one or more processors, the one or more programs including instructions that when executed by the one or more processors cause the system to:

a. receive, at the one or more processors, a full waveform inversion (FWI) image of a subsurface volume of interest including complex geology with two dips at subsurface points;

b. transform the FWI image to the Fourier domain to generate a Fourier domain image, wherein the Fourier domain image is expressed in wavenumber space as Image$_{FWI}$ (k$_x$, k$_y$, k$_z$);

c. perform a multi-dimensional low-cut filter of the Fourier domain image to generate a low-cut filter image, wherein the multi-dimensional low-cut filter is applied to $$k_r = \sqrt{k_x^2 + k_y^2 + k_z^2}$$

to generate the low-cut filter image $\text{Low\_cut}_{FWI}$ ($k_x$, $k_y$, $k_z$) and wherein there is no direction discrimination so all dips in the low-cut filter image are preserved;

d. phase rotate by 90 degrees the low-cut filter image to generate a phase-rotated image in order to match a phase of a seismic migration image;

e. perform an inverse Fourier transform on the phase-rotated image to generate a transformed image, wherein the transformed image includes conflicting dips of reflectors representative of the complex geology; and f. using the transformed image for improved hydrocarbon exploration and hydrocarbon production by identifying traps for subsurface hydrocarbon deposits or hazards for drilling.

4. The computer system of claim 3 wherein the instructions include that the phase rotating is performed as $\text{Rotated}_{FWI}$ ($k_x$, $k_y$, $k_z$)=i*$\text{Low\_cut}_{FWI}$ ($k_x$, $k_y$, $k_z$).

5. A non-transitory computer readable storage medium storing one or more programs, the one or more programs comprising instructions, which when executed by an electronic device with one or more processors and memory, cause the device to a. receive, at the one or more processors, a full waveform inversion (FWI) image of a subsurface volume of interest including complex geology with two dips at subsurface points;

b. transform the FWI image to the Fourier domain to generate a Fourier domain image, wherein the Fourier domain image is expressed in wavenumber space as $\text{Image}_{FWI}$ ($k_x$, $k_y$, $k_z$);

c. perform a multi-dimensional low-cut filter of the Fourier domain image to generate a low-cut filter image, wherein the multi-dimensional low-cut filter is applied to $k_r$, where $$k_r = \sqrt{k_x^2 + k_y^2 + k_z^2}$$

to generate the low-cut filter image $\text{Low\_cut}_{FWI}$ ($k_x$, $k_y$, $k_z$) and wherein there is no direction discrimination so all dips in the low-cut filter image are preserved;

d. phase rotate by 90 degrees the low-cut filter image to generate a phase-rotated image in order to match a phase of a seismic migration image;

e. perform an inverse Fourier transform on the phase-rotated image to generate a transformed image, wherein the transformed image includes conflicting dips of reflectors representative of the complex geology; and f. using the transformed image for improved hydrocarbon exploration and hydrocarbon production by identifying traps for subsurface hydrocarbon deposits or hazards for drilling.

6. The electronic device of claim 5 wherein the instructions include that the phase rotating is performed as $\text{Rotated}_{FWI}$ ($k_x$, $k_y$, $k_z$)=i*$\text{Low\_cut}_{FWI}$ ($k_y$, $k_y$, $k_z$).

* * * * *